United States Patent
Cameron et al.

(10) Patent No.: US 8,095,772 B2
(45) Date of Patent: Jan. 10, 2012

(54) LARGE MEMORY PAGES FOR SHARED LIBRARIES

(75) Inventors: George R. Cameron, Santa Cruz, CA (US); Blake A. Jones, Oakland, CA (US); Rodrick I. Evans, Palto Alto, CA (US); Michael E. Corcoran, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 372 days.

(21) Appl. No.: 12/437,628

(22) Filed: May 8, 2009

(65) Prior Publication Data

US 2010/0287356 A1 Nov. 11, 2010

(51) Int. Cl.
*G06F 12/10* (2006.01)
(52) U.S. Cl. ......................... 711/203; 711/206
(58) Field of Classification Search .................. 711/203, 711/206
See application file for complete search history.

(56) References Cited

U.S. PATENT DOCUMENTS

| | | | |
|---|---|---|---|
| 4,992,936 A * | 2/1991 | Katada et al. | 711/209 |
| 5,327,372 A * | 7/1994 | Oka et al. | 365/49.1 |
| 2003/0088752 A1* | 5/2003 | Harman | 711/202 |
| 2004/0064668 A1* | 4/2004 | Kjos et al. | 711/202 |
| 2008/0288742 A1 | 11/2008 | Hepkin et al. | |
| 2009/0070545 A1 | 3/2009 | Stecher | |

* cited by examiner

*Primary Examiner* — Michael Tran
(74) *Attorney, Agent, or Firm* — Osha • Liang LLP (57) ABSTRACT

A method for loading shared libraries. The method includes receiving an indication of a requirement to load the shared library into the virtual memory and determining that the shared library is a candidate for using shared large pages. Further, the method includes, in response to the determination, storing a text section of the shared library in a shared large page of the virtual memory and storing a data section of the shared library in a page of the virtual memory, where the virtual memory is mapped to a physical memory of the computer, where, within an address space of the virtual memory, a starting address of the text section of the shared library is separated from a starting address of the data section of the shared library by a predefined distance, and where the predefined distance is larger than a size of the large page.

18 Claims, 9 Drawing Sheets

LARGE MEMORY PAGES FOR SHARED LIBRARIES

BACKGROUND

Some computer systems use virtual memory to provide a contiguous memory address space for a given process. That is, a process can execute within the virtual memory as a contiguous address space, even if the process is actually fragmented in physical memory (e.g., random-access memory, magnetic storage on a hard disk, flash memory on a solid state device, etc.). Further, by selectively transferring data from physical memory to disk-based storage (e.g., a hard drive), virtual memory can be used to execute a process that requires a larger memory address space than that of the available physical memory. When a process requires a data object stored in virtual memory, the virtual memory address of the object is translated to the corresponding physical memory address(es) where the object is physically stored. Typically, virtual memory is divided into pages of one or more sizes, which correspond to the page sizes supported by a processor's memory management unit.

One type of data object that may be stored in virtual memory is a library. A library is a collection of subroutines or classes which contain code and data that provide services to a given program (or set of programs).

SUMMARY

In general, in one aspect, the invention relates to a method for loading shared libraries into a virtual memory of a computer, including receiving an indication of a requirement to load the shared library into the virtual memory; and determining that the shared library is a candidate for using shared large pages. The method also includes, in response to the determination: storing a text section of the shared library in a shared large page of the virtual memory; and storing a data section of the shared library in a page of the virtual memory; where the virtual memory is mapped to a physical memory of the computer; where, within an address space of the virtual memory, a starting address of the text section of the shared library is separated from a starting address of the data section of the shared library by a predefined distance; and where the predefined distance is larger than a size of the large page.

In general, in one aspect, the invention relates to a system including a processor, a physical memory, and a computer usable storage medium having computer readable program code embodied therein. The computer readable program code is adapted to, when executed by the processor, implement a method for loading a shared library into a virtual memory, the method including receiving an indication of a requirement to load the shared library into the virtual memory; and determining that the shared library is a candidate for using shared large pages. The method also includes, in response to the determination: storing a text section of the shared library in a shared large page of the virtual memory; and storing a data section of the shared library in a page of the virtual memory; where the virtual memory is mapped to a physical memory of the computer; where, within an address space of the virtual memory, a starting address of the text section of the shared library is separated from a starting address of the data section of the shared library by a predefined distance; and where the predefined distance is larger than a size of the large page.

In general, in one aspect, the invention relates to a computer usable storage medium having computer readable program code embodied therein. The computer readable program code adapted to, when executed by a processor, implement a method for loading a shared library into a virtual memory, the method including receiving an indication to load the shared library into the virtual memory; and determining that the shared library is not identified in a library registry. The method also includes, in response to the determination: storing a text section of the shared library at a virtual address located in a shared large page of the virtual memory; updating the library registry with the virtual address and a physical address of the text section of the shared library, wherein the virtual address is designated as a preferred virtual address for mapping the shared library, and wherein the physical address is located in a large page of the physical memory; and creating an entry in a shared page table to map the large page of the physical memory to the shared large page of the virtual memory, where the shared page table is shared by a plurality of processes, where the virtual memory is mapped to the physical memory, where the library registry is a data structure which identifies the shared library to the plurality of processes.

Other aspects of the invention will be apparent from the following description and the appended claims.

DETAILED DESCRIPTION

Specific embodiments of the invention will now be described in detail with reference to the accompanying Figs. Like elements in the various Figs. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for using computer memory. More specifically, embodiments of the invention relate to a method and system for using large pages of virtual memory to store shared software libraries (e.g., libc, libnsl, libsocket, or any other shared software library) (hereafter referred to as a "shared library"). The virtual memory may provide a contiguous memory address space for each process executing on a computer. When loaded into the virtual memory, each shared library is typically stored in at least two parts, a text section and a data section. The text section may include executable library code and read-only data, and may thus have read-only privileges to prevent any modification by a process. The data section includes the writable variables and other writable data used with the shared library by a given process, and, thus, may have read-write privileges for that process. In one or more embodiments, the text section of a shared library is stored in a large page of virtual memory. Further, the data section of the shared library is stored in one or more pages (which may be a large page) located at a predefined distance within the virtual memory address space from the large page in which the corresponding text section is stored.

Figure 1:
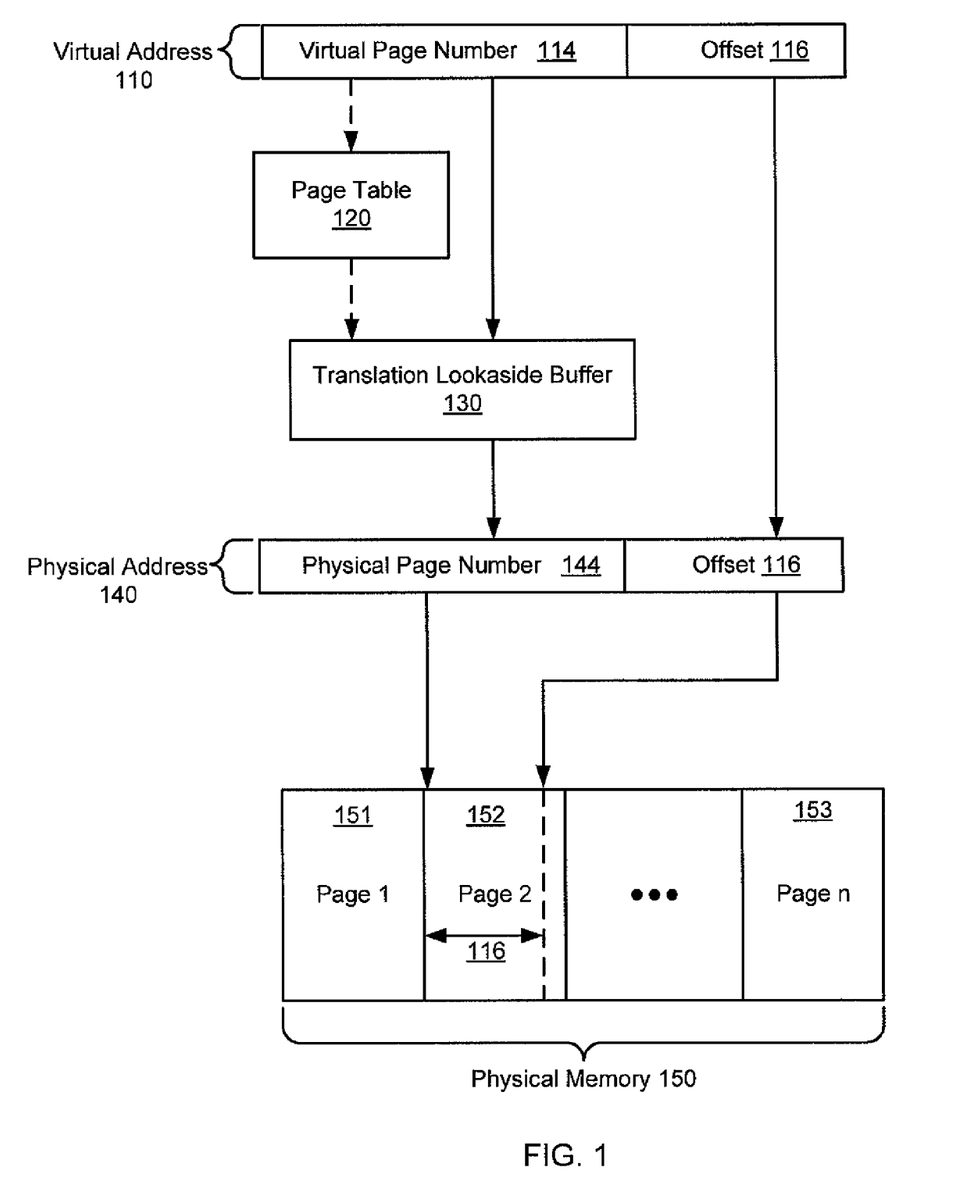
FIG. 1 shows a virtual memory system in accordance with one or more embodiments of the invention.

FIG. 1 shows a virtual memory system in accordance with an embodiment of the invention. As shown in FIG. 1, a virtual memory address (110) includes a virtual page number (114) and an offset (116) within the page. A physical memory address (140) points to a location in a physical memory (150), which is divided into several physical pages (e.g., Page 1 (151), Page 2 (152), Page n (153)). The physical memory address (140) includes the offset (116) and a physical page number (144) (which corresponds to the virtual page number (114)). In one embodiment, a translation lookaside buffer (TLB) (130) includes entries of page translation data. More specifically, each entry in the TLB (130) includes data which translates a virtual page number (114) to a physical page number (144). For example, referring to FIG. 1, assume that the physical page number (144) corresponds to Page 2 (152) of the physical memory (150). Thus, in this example, the data corresponding to the virtual address (110) is physically stored in Page 2 (152) of the physical memory (150), specifically at the location having the offset (116) (shown as a dotted line).

Typically, the number of entries in the TLB (130) is much smaller than the number of virtual pages in the virtual memory system and/or the number of physical pages. Accordingly, in some situations, the TLB (130) may not include an entry required to translate a particular virtual memory address (110) into the corresponding physical memory address (140). If a reference is made to a virtual address which does not have a translation in the TLB (130), an event referred to as a "TLB miss" occurs. When a TLB miss occurs, the required entry may be created in the TLB (130) by retrieving page translation data (shown as a dotted arrow) from a page table (120). In one or more embodiments, the page table (120) is a data structure which includes page translation data for each virtual page within the virtual memory address space of a given process. In other words, each process using virtual memory may have its own dedicated page table (120).

One skilled in the art will appreciate that FIG. 1 is merely an exemplary illustration of one embodiment of the invention. For example, while FIG. 1 illustrates a single virtual memory address, the virtual memory system may typically include multiple virtual memory addresses. Further, one skilled in the art will appreciate that the terms used in this description have other recognized names. For example, a page table may also be known as a translation storage buffer, and physical memory pages may be referred to as physical page frames.

Figure 2A:
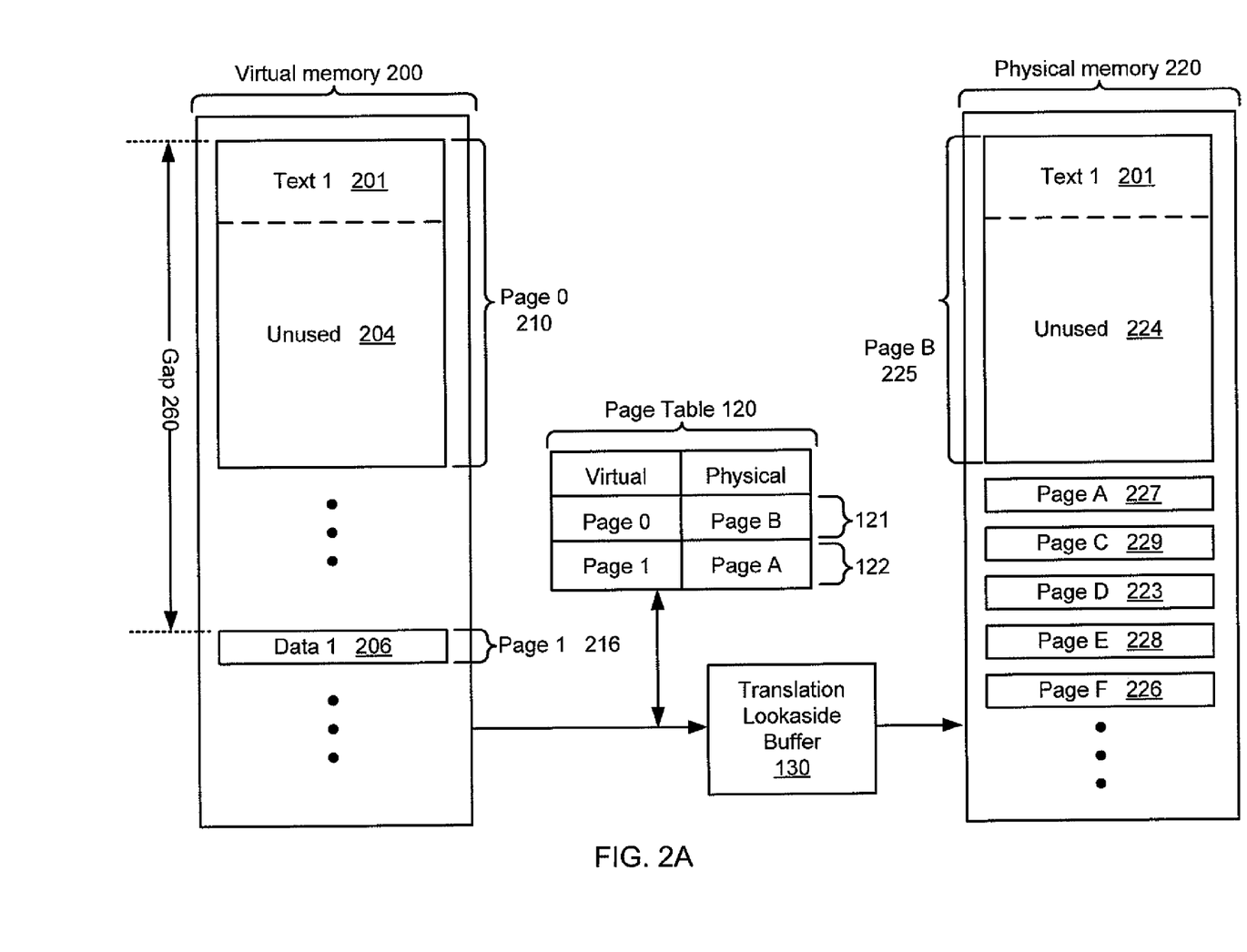
FIGS. 2A-2C show block diagrams of exemplary virtual memory systems in accordance with one or more embodiments of the invention.
Figure 2B:
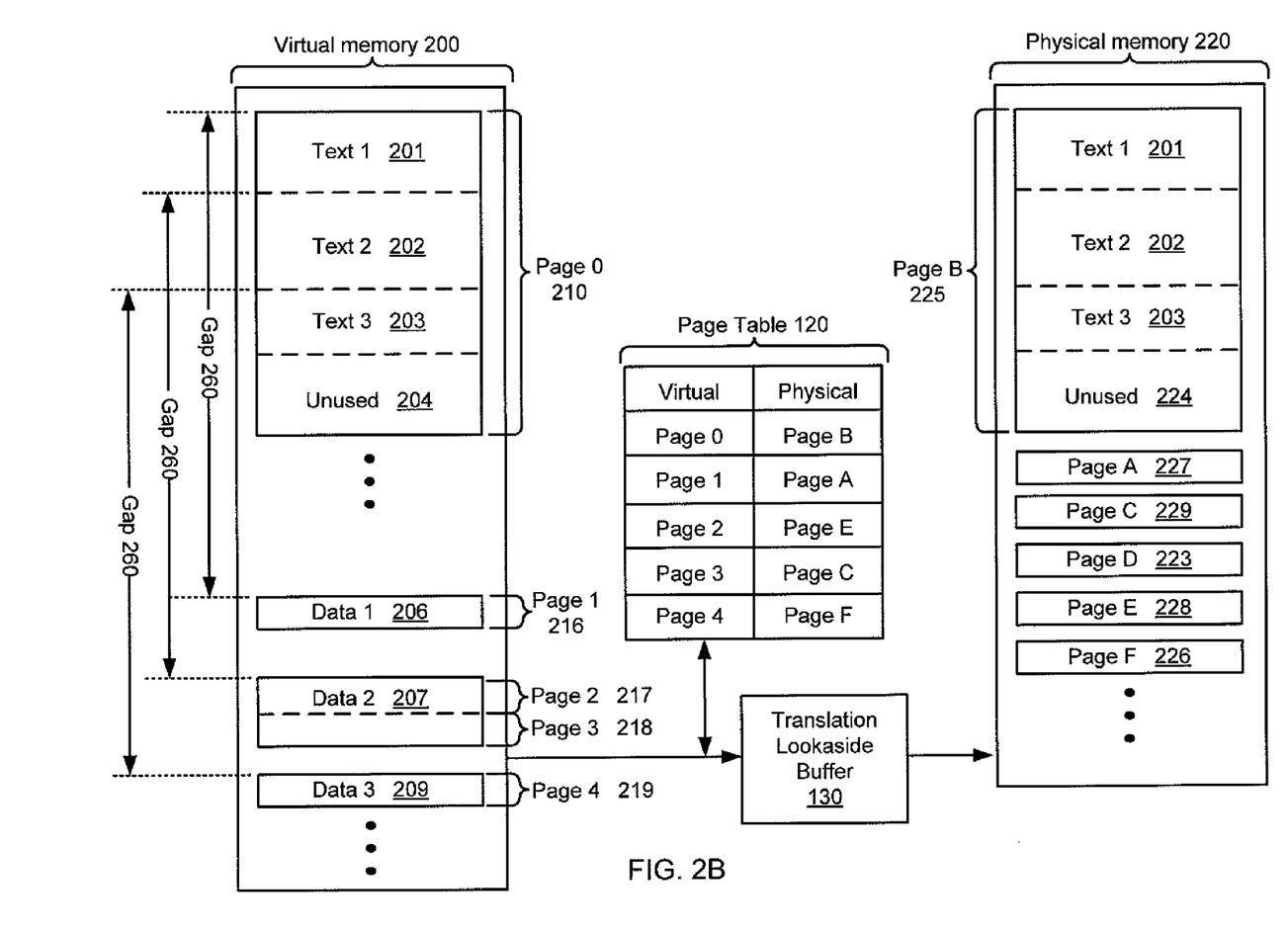
Figure 2C:
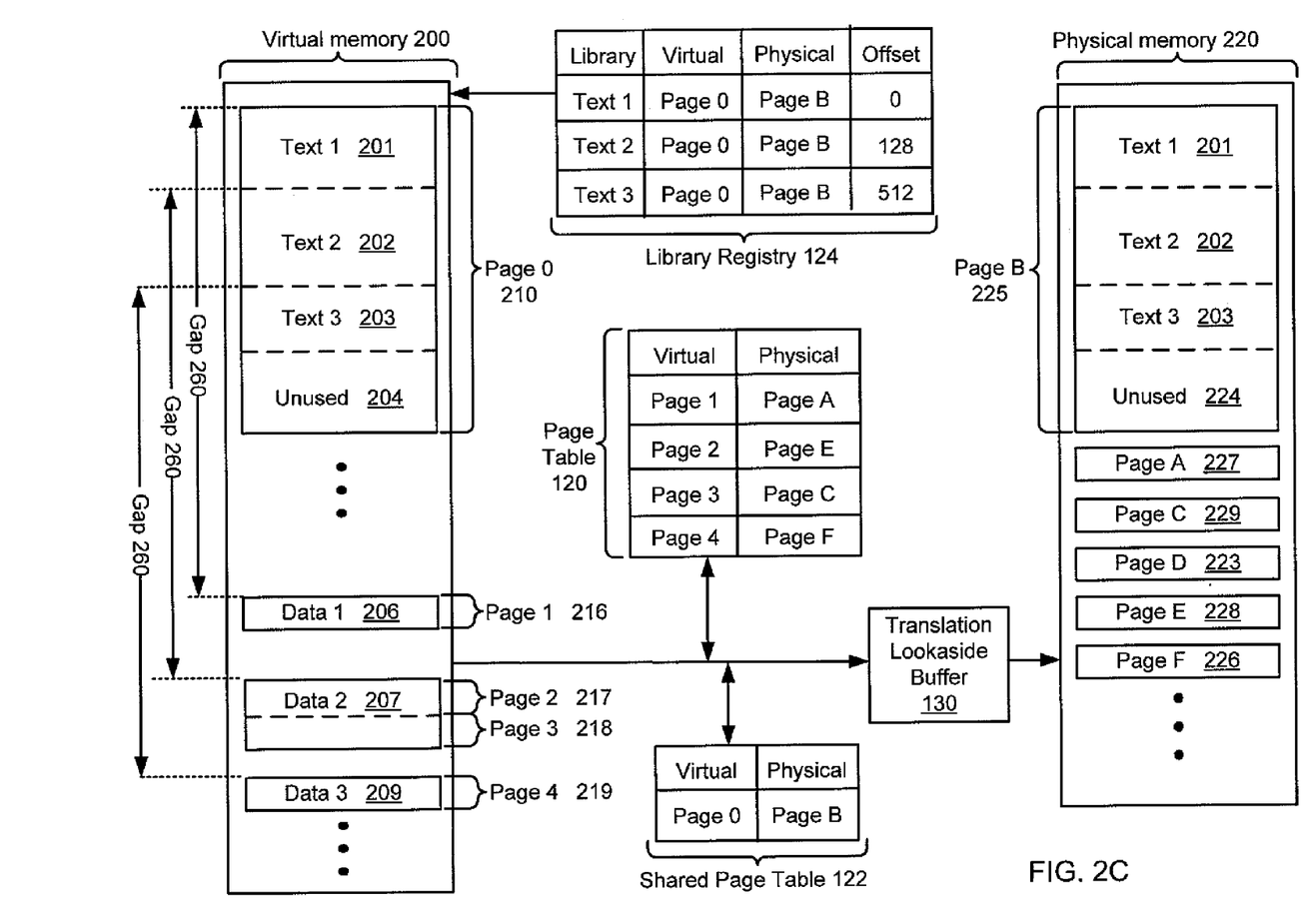

FIGS. 2A-2C show block diagrams of exemplary virtual memory systems in accordance with embodiments of the invention. FIG. 2A shows a virtual memory system using a large page of virtual memory to store a shared library in accordance with one embodiment. As shown in FIG. 2A, the virtual memory system may include a virtual memory (200) and a physical memory (220). In particular, the virtual memory (200) may represent a virtual memory address space of a single process. As described above with reference to FIG. 1, an address within the virtual memory (200) (e.g., virtual memory address (110) shown in FIG. 1) is mapped to a corresponding address within the physical memory (220) (e.g., physical memory address (140) shown in FIG. 1). Such mappings may be performed using the TLB (130). In the event that there is a TLB miss, the required page translation data may be obtained from the page table (120). One skilled in the art will appreciate that, as used herein, the expression "storing in virtual memory" refers to mapping a virtual memory address to a physical address.

In one or more embodiments, the virtual memory (200) may include regular pages of a uniform size (e.g., 4KB). Further, in one or more embodiments, the virtual memory (200) may also include one or more large pages for storing text sections of shared libraries (also referred to herein as "shared large pages"). Each large page may be of a larger size than a regular page (e.g., 4MB). However, for either regular pages or large pages, each unique virtual page is mapped using a single entry in the TLB (130). Thus, when loading a shared library into virtual memory, the use of a large page instead of multiple smaller pages may result in requiring fewer entries in the TLB (130). For example, as shown in FIG. 2A, the virtual memory (200) includes a large page named "Page 0" (210). As shown, "Page 0" (210) includes the text section "Text 1" (201) of a shared library. Note that "Text 1" (201) is smaller than "Page 0" (210), thus leaving an unused space (204) remaining on "Page 0" (210). In one or more embodiments, the page storing the text section of the shared library (e.g., "Page 0" (210)) may only have read-only privileges for any process(es) accessing the shared library.

Additionally, the virtual memory (200) includes a regular page "Page 1" (216), which stores the data section "Data 1" (206). Assume "Data 1" (206) stores the library data used with "Text 1" (201). In one or more embodiments, within the virtual memory (200), the start of the data section of the shared library is located at a predefined distance after the start of the text section of the shared library. For example, as shown in FIG. 2A, the start of "Text 1" (201) and the start of "Data 1" (206) are separated by a predefined distance represented by a gap (260). In one or more embodiments, the predefined distance is larger than the large page. For example, referring to FIG. 2A, the gap (260) may be 128MB in size, and the large page "Page 0" (210) may be 4MB in size. Accordingly, in this example, the gap (260) is substantially larger than the large page "Page 0" (210). Those skilled in the art will appreciate that the terms "large page" and "regular page" are relative terms, whose absolute size is not limited to the examples included above. Rather, the exemplary sizes of the large and regular pages are intended to illustrate the relative difference in size between the large and regular pages. Further, the exemplary size of the gap included above should not be construed as limiting the gap to the aforementioned size. Rather, the exemplary size of the gap is included to illustrate the relative size of the gap with respect to the large and regular pages.

Returning to FIG. 2A., in one or more embodiments, a link editor (not shown) may construct the shared library, and may set the predefined distance between the start of the data section and the start of the text section. One skilled in the art will appreciate that, if the predefined distance is substantially larger than a large page, the virtual memory address space between "Page 0" (210) and "Page 1" (216) may include one or more other large pages and/or regular pages (not shown). In one or more embodiments, the page storing the data section of the shared library (e.g., "Page 1" (216)) may have read-write privileges for any process(es) accessing the shared library.

As shown in FIG. 2A, the physical memory (220) includes physical pages "Page B" (225), "Page A" (227), "Page C" (229), "Page D" (222), "Page E" (228), and "Page F" (226). The page table (120) includes a first entry (121) which maps the virtual page "Page 0" (210) to the physical page "Page B" (225), a second entry (122) which maps the virtual page "Page 1" (206) to the physical page "Page A" (227), and so on.

Further, when "Page 0" (210) and "Page 1" (216) are loaded in virtual memory, the entries (121) and (122) may be copied from the page table (120) into the TLB (130).

One skilled in the art will recognize that each virtual page has the same size and contents as the physical page to which it is mapped. Accordingly, "Page B" (225) has the same size as "Page 0" (210), and also includes "Text 1" (201). Further, "Page B" (225) includes unused space (224) that is the same size as the unused space (204) remaining on "Page 0" (210). However, in one or more embodiments, physical pages are not required to be arranged in the same manner as the virtual pages to which they correspond. For example, as shown in FIG. 2A, "Page B" (225) and "Page A" (227) are not separated by the gap (260) within the physical memory (220).

In one or more embodiments, a large page of virtual memory may store the text sections of multiple shared libraries. Such use of a large page may result in fewer entries in the TLB (130) being required in order to load the shared libraries into virtual memory. For example, as shown in FIG. 2B, the large page "Page 0" (210) may store text sections of three different shared libraries, namely "Text 1" (201), "Text 2" (202), and "Text 3" (203). In one or more embodiments, as each shared library is loaded into virtual memory, the text section of that shared library may be placed or located within any unused space (204) remaining on "Page 0" (210). Further, if the unused space (204) is too small to store all of the text section being added, a new large page (not shown) may be added to store the remaining portion of the text section being added. In such a case, the new large page is located immediately after "Page 0" (210) in virtual memory, such that the added text section contiguously spans across "Page 0" (210) and the new large page. Note that, while the virtual pages which contain the text section (e.g., "Page 0" (210) and the new large page) are virtually contiguous, it is not required that the corresponding physical pages be physically contiguous.

In one or more embodiments, for each text section stored in "Page 0" (210), there may be a corresponding data section stored in one or more other pages of virtual memory. For example, as shown on FIG. 2B, the data section "Data 1" (206) is stored in "Page 1" (216), and corresponds to "Text 1" (201). In another example, the data section "Data 2" (207) may be too large to be stored in a single regular page, and may thus be stored in two regular pages, namely "Page 2" (217) and "Page 3" (218). Further, "Data 2" (207) corresponds to "Text 2" (202). In yet another example, the data section "Data 3" (209) is stored in "Page 4" (219), and corresponds to "Text 3" (203). As shown, the data section of each shared library (i.e., "Data 1" (206), "Data 2" (207), "Data 3" (208)) is located at a defined distance (i.e., gap (260)) after the start of the text section of the corresponding shared library (i.e., "Text 1" (201), "Text 2" (202), "Text 3" (203)).

In one or more embodiments, the page table (120) maps each page of virtual memory (200) to a corresponding page of physical memory (220). For example, as shown on FIG. 2B, virtual page "Page 0" (210) is mapped to physical page "Page B" (225), virtual page "Page 1" (216) is mapped to physical page "Page A" (227), virtual page "Page 2" (217) is mapped to physical page "Page E" (228), and so forth. Each entry of the page table (120) may be loaded into the TLB (130) as required by a current process. One skilled in the art will appreciate that the text sections of the three shared libraries loaded into "Page 0" (210) together only require a single entry in the TLB (130). Further, in contrast to the arrangement of the virtual pages storing sections of the shared libraries, the corresponding physical pages are not required to be arranged so as to maintain the gap (260) between the text sections and data sections of the shared libraries.

In one or more embodiments, a virtual memory mapping of a large page of physical memory may be shared across different processes. The use of a shared virtual memory mapping may reduce the number of page table entries that must be maintained to handle a TLB miss. As shown in FIG. 2C, the virtual memory system of FIG. 2B may be modified to include a library registry (124) and a shared page table (122), in accordance to one embodiment. The library registry (124) may be a data structure including entries describing the preferred starting virtual memory address (i.e., virtual page and offset) and the starting physical address (i.e., physical page and offset) of each shared library. The shared page table (122) may be a page table that stores page translation data for large virtual pages that are shared across different processes.

In one or more embodiments, each entry of the library registry (124) is created when a text section of a shared library is first loaded into a large page of virtual memory (i.e., as described above with reference to FIG. 2B). For example, as shown in FIG. 2C, each of the three entries of the library registry (124) may have been created as the respective text section (i.e., "Text 1" (201), "Text 2" (202), "Text 3" (203)) was loaded into "Page 0" (210). Subsequently, any process that requests one of these shared libraries, and which can still use the part of its virtual address space described by the preferred virtual memory address, may map the text section of that shared library to the preferred virtual memory address specified in the library registry (124). Further, the shared page table (122) may be updated with page translation data for the large page(s) storing the text sections of the shared libraries. For example, as shown in FIG. 2C, the shared page table (122) may be updated to include an entry mapping the virtual page "Page 0" (210) to physical page "Page B" (225). The shared page table (122) may then be used by any process which has a mapping from virtual page "Page 0" to physical page "Page B," and which takes a TLB miss for any of the shared libraries included in the large page. In this manner, the number of page tables entries that must be maintained may be reduced.

Those skilled in the art will appreciate that while FIG. 2C includes a shared page table (122), other embodiments of the invention may be implemented to achieve the same result as using the shared page table (122) without a shared page table being present. For example, the information conveyed by the shared page table may be stored in the library registry (124). In such cases, the information in the library registry (124) may then be used to include appropriate entries in each of the page tables (120) (which are per-process) as opposed to including a single entry in a shared page table (122).

In one or more embodiments, the entries included in the library registry (124) may be adjusted based on a frequency of use of each shared library. In other words, shared libraries may be added or removed from the library registry (124) based on how often each is used. For example, the library registry (124) may only include entries for shared libraries that meet a minimum usage threshold (e.g., a library that is used ten times per week, a library that is used by at least five processes at the same time, etc.). The library registry (124) may be reserved for libraries which can be used by any process in the system. Optionally, the library registry (124) may be reset during a system reboot, or may be stored persistently so as to be maintained after a system reboot.

One skilled in the art will appreciate that FIGS. 2A-2C are merely exemplary illustrations of one embodiment of the invention, and are not intended to limit the invention. For example, the library registry (124) may include multiple entries for one shared library. In another example, the page table (120) and/or the shared page table (122) may include additional or different data fields than those shown in the FIGS. 2A-2C.

Figure 3A:
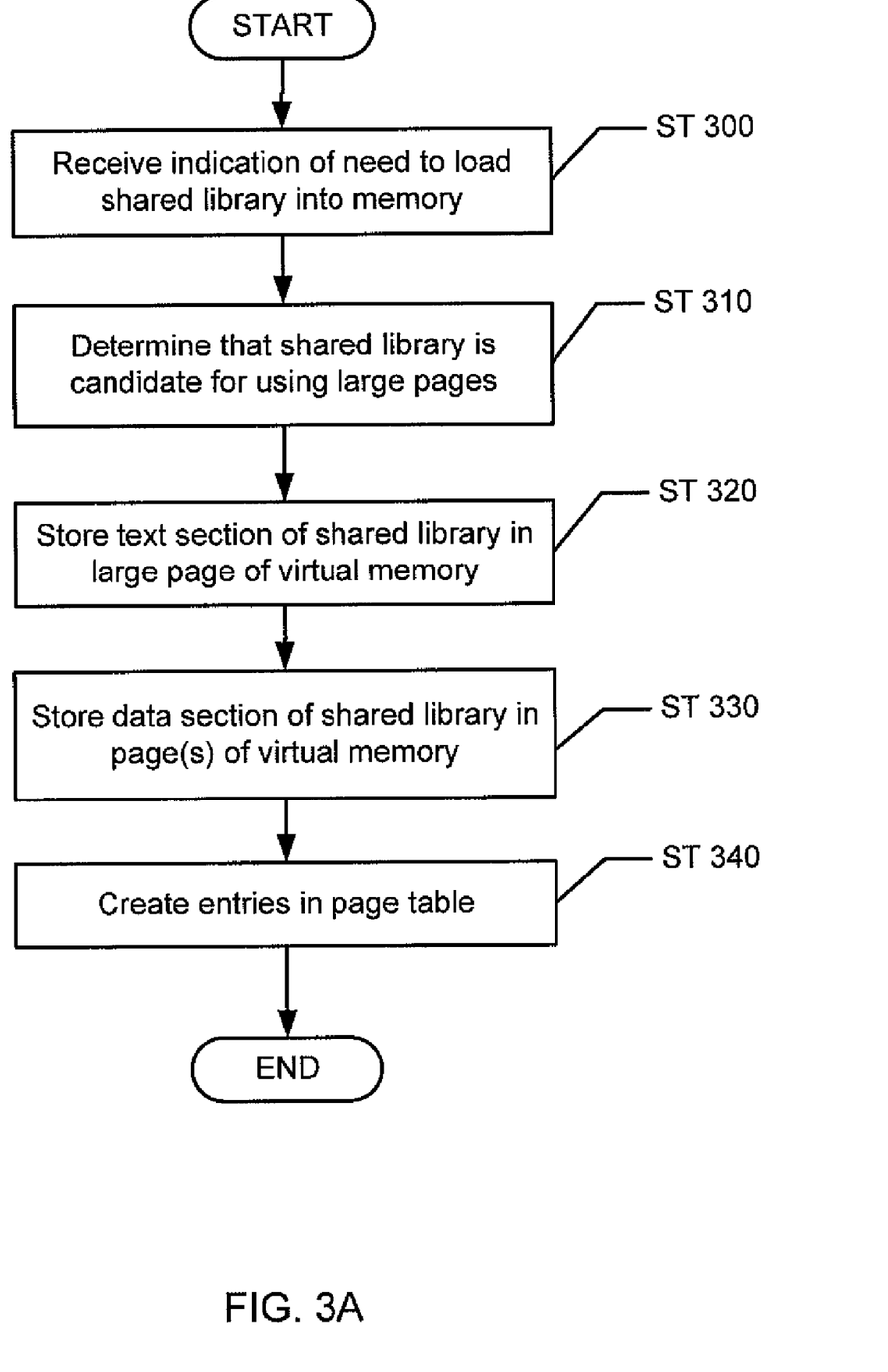
FIGS. 3A-3C show flow charts in accordance with one or more embodiments of the invention.
Figure 3B:
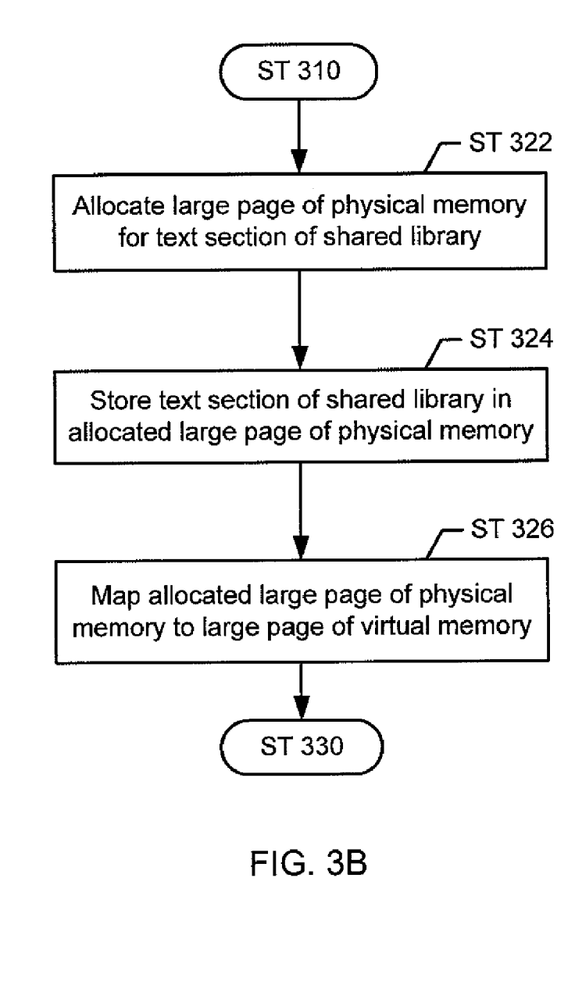
Figure 3C:
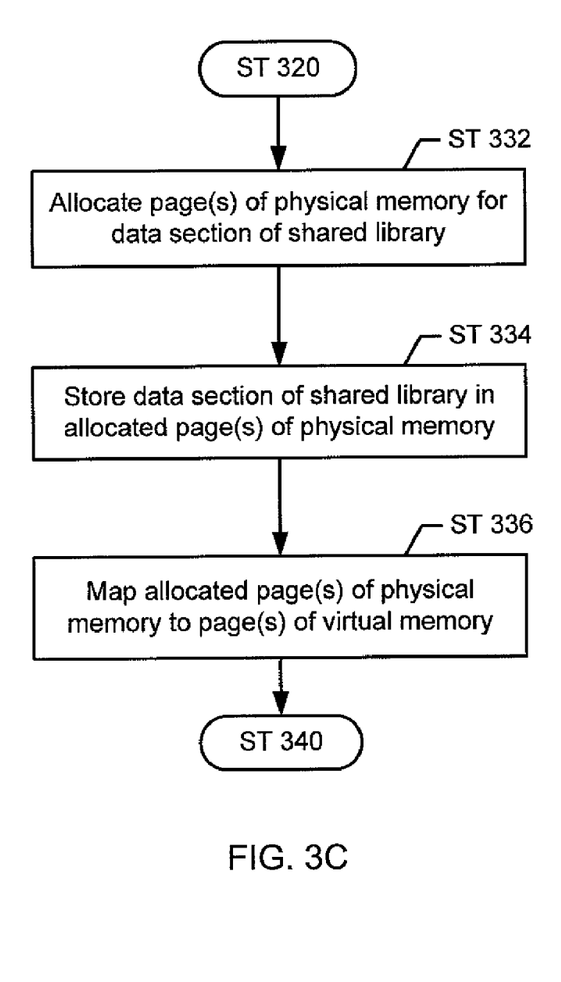

FIGS. 3A-3C show flow charts for methods in accordance with one or more embodiments of the invention. In one or more embodiments of the invention, one or more of the steps described below may be omitted, repeated, performed in parallel, and/or performed in a different order. Accordingly, the specific arrangement of steps shown in FIGS. 3A-3C should not be construed as limiting the scope of the invention.

FIG. 3A shows a flow chart for a method for loading a shared library into a virtual memory system, in accordance with one or more embodiments of the invention. In particular, FIG. 3A illustrates a method corresponding to the virtual memory system described above with reference to FIG. 2A.

At ST 300, an indication of a need to load a shared library into memory may be received. For example, a user of a computer may open a software application which requires a shared library, thus requesting the shared library to be loaded in memory. At ST 310, it may be determined that the shared library is a candidate for using shared large pages of virtual memory. For example, the virtual memory system may determine that the shared library has been compiled to use a large predefined gap between the text section and the data section. Further, the virtual memory system may determine that the shared library is permitted to be shared by all processes on the system. Those skilled in the art will appreciate that other mechanisms and/or heuristics may be used to indicate that a given shared library is a candidate for using shared large pages.

At ST 320, the text section of the shared library (e.g., "Text 1" (201) shown in FIG. 2A) may be stored in a large page of virtual memory (e.g., "Page 0" (210) shown in FIG. 2A). ST 320 is described in greater detail below with reference to FIG. 3B. At ST 330, the data section of the shared library (e.g., "Data 1" (206) shown in FIG. 2A) may be stored in one or more regular pages of virtual memory (e.g., "Page 1" (216) shown in FIG. 2A). ST 330 is described in greater detail below with reference to FIG. 3C. At ST 340, entries may be created in a page table to map the virtual pages to corresponding physical pages. For example, referring to FIG. 2A, the page table (120) is updated with entry (121) to map virtual page "Page 0" (210) to physical page "Page B" (225), and is updated with entry (122) to map virtual page "Page 1" (216) to physical page "Page A" (227).

FIG. 3B shows a flow chart for storing a text section of a shared library in a large page of virtual memory, in accordance to one or more embodiments of the invention. In particular, FIG. 3B illustrates an exemplary expansion of the steps involved in performing ST 320 (shown in FIG. 3A).

At ST 322, a large page of physical memory (e.g., "Page B" (225) shown in FIG. 2A) may be allocated to store a text section of a shared library (e.g., "Text 1" (201) shown in FIG. 2A). At ST 324, the text section of the shared library may be stored in the large page of physical memory. For example, referring to FIG. 2A, the text section "Text 1" (201) is stored in the large page "Page B" (225) of physical memory (220). At ST 326, the allocated large page of physical memory is mapped to a large page of virtual memory. For example, referring to FIG. 2A, the large page "Page B" (225) of physical memory may be mapped to the large page "Page 0" (210) of virtual memory. In one embodiment, the mapping may be stored in the page table (120).

FIG. 3C shows a flow chart for storing a data section of a shared library in one or more regular pages of virtual memory, in accordance to one or more embodiments of the invention. In particular, FIG. 3C illustrates an exemplary expansion of the steps involved in performing ST 330 (shown in FIG. 3A).

At ST 332, one or more pages of physical memory (e.g., "Page A" (227) shown in FIG. 2B) may be allocated to store the data section of a shared library (e.g., "Data 1" (206) shown in FIG. 2B). At ST 334, the data section of the shared library may be stored in the allocated page(s) of physical memory. For example, referring to FIG. 2B, the data section "Data 1" (206) is stored in the regular page "Page A" (227) of physical memory (220). At ST 336, the allocated pages of physical memory are mapped to pages of virtual memory. For example, referring to FIG. 2B, the physical page "Page A" (227) may be mapped to the virtual page "Page 1" (216). In one embodiment, the mapping may be stored in the page table (120).

Figure 4:
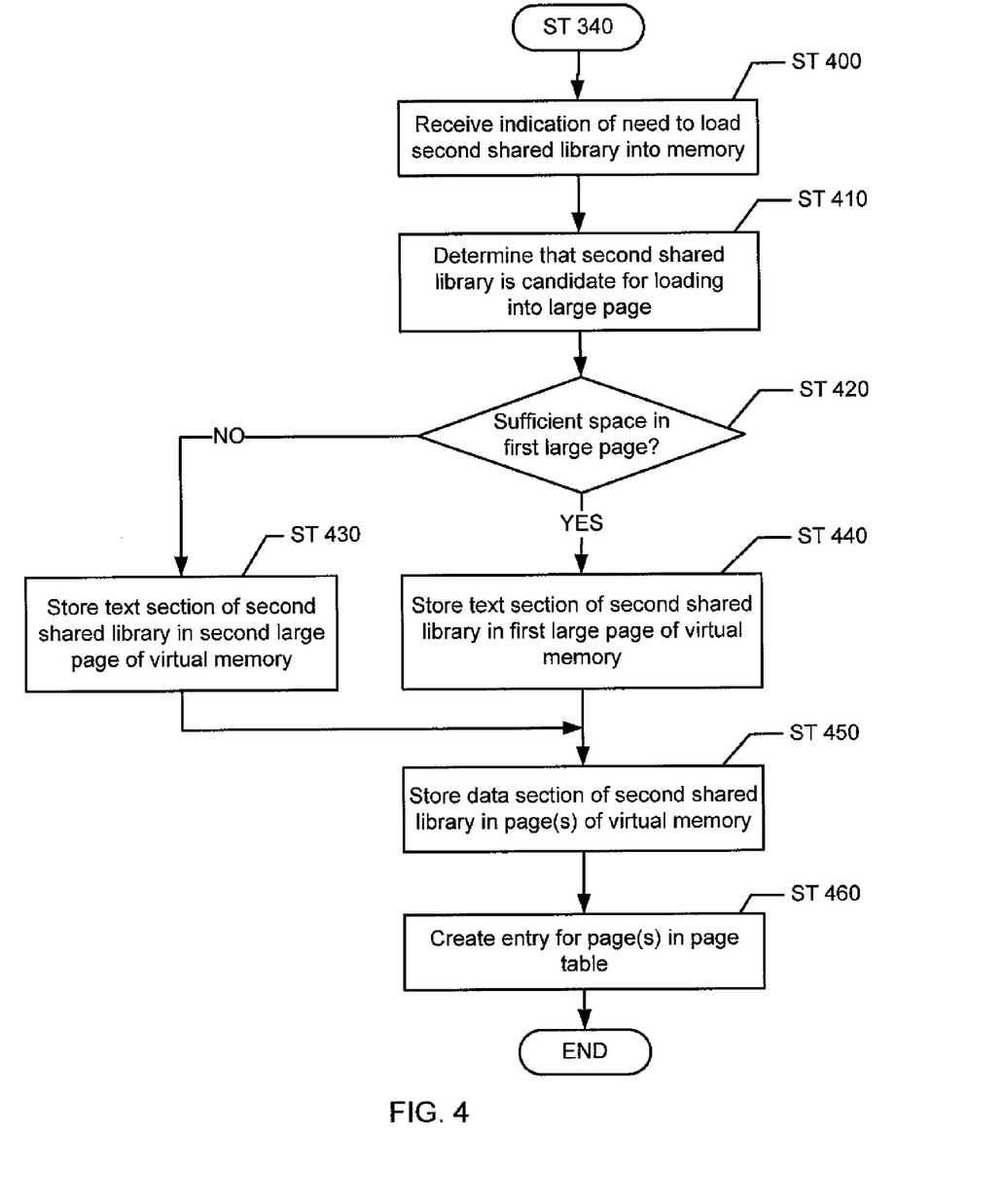
FIG. 4 shows a flow chart in accordance with one or more embodiments of the invention.

FIG. 4 shows a flow chart for a method for loading a second (i.e., another or subsequent) shared library into a virtual memory system, in accordance with one or more embodiments of the invention. In particular, FIG. 4 illustrates a method corresponding to the virtual memory system described above with reference to FIG. 2B. Further, the flowchart of FIG. 4 represents a continuation of the flowchart shown in FIG. 3A.

After ST 340 (shown in FIG. 3A), an indication of a need to load a second shared library into memory may be received (ST 400). At ST 410, a determination is made (using mechanisms described in ST 310) that the second shared library is a candidate for using shared large pages of virtual memory. At ST 420, a determination is made about whether there is sufficient space remaining in a shared large page of virtual memory to store a text section of the second shared library. For example, referring to FIG. 2B, it may be determined whether the unused space (204) in the first large page "Page 0" (210) is equal to or larger than text section "Text 2" (202). If it is determined that there is sufficient space remaining in the first large page, then at ST 440, the text section of the second shared library (e.g., "Text 2" (202) shown in FIG. 2B) may be stored on the first large page (e.g., "Page 0" (210) shown in FIG. 2B). However, if it determined that there is not sufficient space remaining in the first large page, then at ST 430, the text section of the second shared library is stored on a second large page. Alternatively, a first portion of the text section of the second shared library may be stored in the first large page, and a remaining portion of the text section of the second shared library may be stored in the second large page. In other words, as described above with reference to FIG. 2B, the text section of the second shared library may span across the first large page and the second large page.

After either ST 430 or ST 440, at ST 450, the data section of the second shared library (e.g., "Data 2" (207) shown in FIG. 2B) may be stored in one or more regular pages of virtual memory (e.g., "Page 2" (217) and "Page 3" (218) shown in FIG. 2B). At ST 460, entries for both text and data sections of the second shared library may be created in a page table to map the virtual pages to corresponding physical pages. For example, referring to FIG. 2B, the page table (120) is updated with page translation data to map virtual page "Page 2" (217) to physical page "Page E" (228), and to map virtual page "Page 3" (218) to physical page "Page C" (229).

Figure 5:
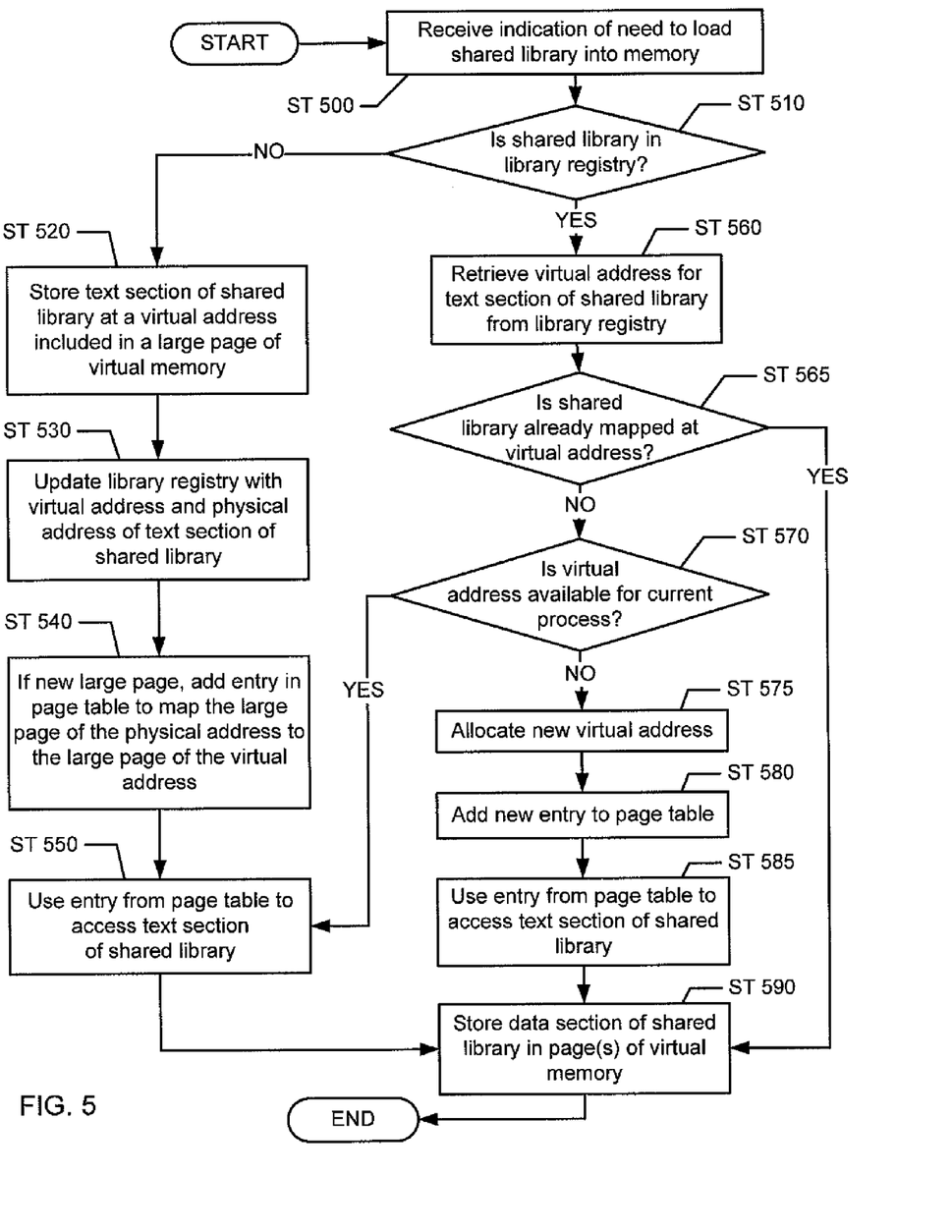
FIG. 5 shows a flow chart in accordance with one or more embodiments of the invention.

FIG. 5 shows a flow chart for a method for sharing a virtual memory mapping of a large page of physical memory across different processes, in accordance with one or more embodiments of the invention. In particular, FIG. 5 illustrates a method corresponding to the virtual memory system described above with reference to FIG. 2C.

At ST 500, an indication of a need to load a shared library into memory for a process may be received. For example, a user of a computer may open a software application which requires a shared library, thus requesting the shared library to be loaded in memory. At ST 510, a determination is made about whether the shared library is already included in a library registry (e.g., library registry (124) shown in FIG. 2C). In one or more embodiments, the shared library is included in the library registry after the shared library is first loaded into memory by another process. Optionally, the shared library is included in the library registry at start-up.

If the shared library is not included in the library registry, then at ST 520, the text section of the shared library (e.g., "Text 1" (201) shown in FIG. 2C) may be stored in a large page of virtual memory (e.g., "Page 0" (210) shown in FIG. 2C). The large page may be a new page allocated to store the text section of the shared library, or may be an existing page having sufficient unused space to store the text section of the shared library. Alternatively, the text section of the shared library may span across an existing large page and a new large page, as described above with reference to FIG. 4. Note that ST 520 is similar to ST 320 or ST 430 described above with reference to FIGS. 3A-3B and FIG. 4.

At ST 530, the library registry may be updated to include the virtual address and physical address of the shared library. For example, referring to FIG. 2C, the library registry (124) may be updated with an entry for the text section "Text 1" (201), including the virtual page "Page 0" (210), the physical page "Page B" (225), and an offset. The virtual page "Page 0" (210) may be chosen by examining the current processes' virtual address space, by examining data associated with the library, or by other methods. At ST 540, if a new large page was used to store the text section of the shared library (at ST 520), then an entry may be added to a private page table (e.g., page table (120) shown in FIG. 2C) or a shared page table (e.g., shared page table (122) shown in FIG. 2C) to map the virtual page to the physical page. The entry added to the library registry (at ST 530) and the entry added to the shared page table (at ST 540) are subsequently available for use by any other process requiring the shared library.

At ST 550, the entry in the shared page table may be used to access the text section of the shared library. For example, referring to FIG. 2C, in the event that a process suffers a TLB miss, the process may retrieve page translation data from the shared page table (122) to populate the TLB (130). At ST 590, the data section of the shared library (e.g., "Data 1" (206) shown in FIG. 2C) may be stored in one or more regular pages of virtual memory (e.g., "Page 1" (216) shown in FIG. 2C). Note that ST 590 is similar to ST 330 described above with reference to FIG. 3A and FIG. 3C.

However, if it is determined at ST 510 that the shared library is already included in the library registry, then at ST 560, the virtual address for the text section of the shared library (e.g., "Text 1" (201) shown in FIG. 2C) may be retrieved from the library registry (e.g., library registry (124) shown in FIG. 2C). In other words, if another process has already loaded the shared library into a preferred virtual memory address, the current process may retrieve the preferred virtual memory address from the library registry.

At ST 565, a determination is made about whether the shared library is already mapped at the preferred virtual address. For example, the shared library may have been included in a shared large page that was mapped into virtual memory to provide access to a different shared library. If the shared library is already mapped at the preferred virtual address, the method then continues at ST 590 (described above). However, if the shared library is not already mapped at the preferred virtual address, then at ST 570, a determination is made about whether the preferred virtual address is available for use by the process. The preferred virtual address is not available if the process has already allocated that virtual address. If is determined that the virtual address is available for use by the process, then the method continues at ST 550 (described above). More specifically, the process uses an existing entry in the shared page table to access the text section of the shared library. Thus, in one or more embodiments of the invention, no additional entry corresponding to the text section needs to be added to the page table (120) or the shared page table (122). One skilled in the art will appreciate that the use of the shared page table (122) across multiple processes may reduce the amount of memory needed to hold page tables. Moreover, on a computer which can share page table entries between multiple processes, use of the shared page table (122) may reduce the number of TLB misses.

However, if it is determined at ST 570 that the preferred virtual address is not available for use by the process, then at ST 575, a new virtual address (i.e., different from the preferred virtual address) is allocated to map the shared library for the process. In one or more embodiments, the new virtual address is included in a different virtual page than the virtual page containing the preferred virtual address. At ST 580, an entry is added to a private page table (e.g., page table (120) shown in FIG. 2C) to map the virtual page containing the new virtual address to the physical page containing the text section of the shared library. At ST 585, the process may use the entry added to the private page table to access the text section of the shared library. For example, referring to FIG. 2C, in the event that a process suffers a TLB miss, the process may retrieve page translation data from a private page table (120) dedicated to that process in order to populate the TLB (130). The method then continues at ST 590 (described above).

Figure 6:
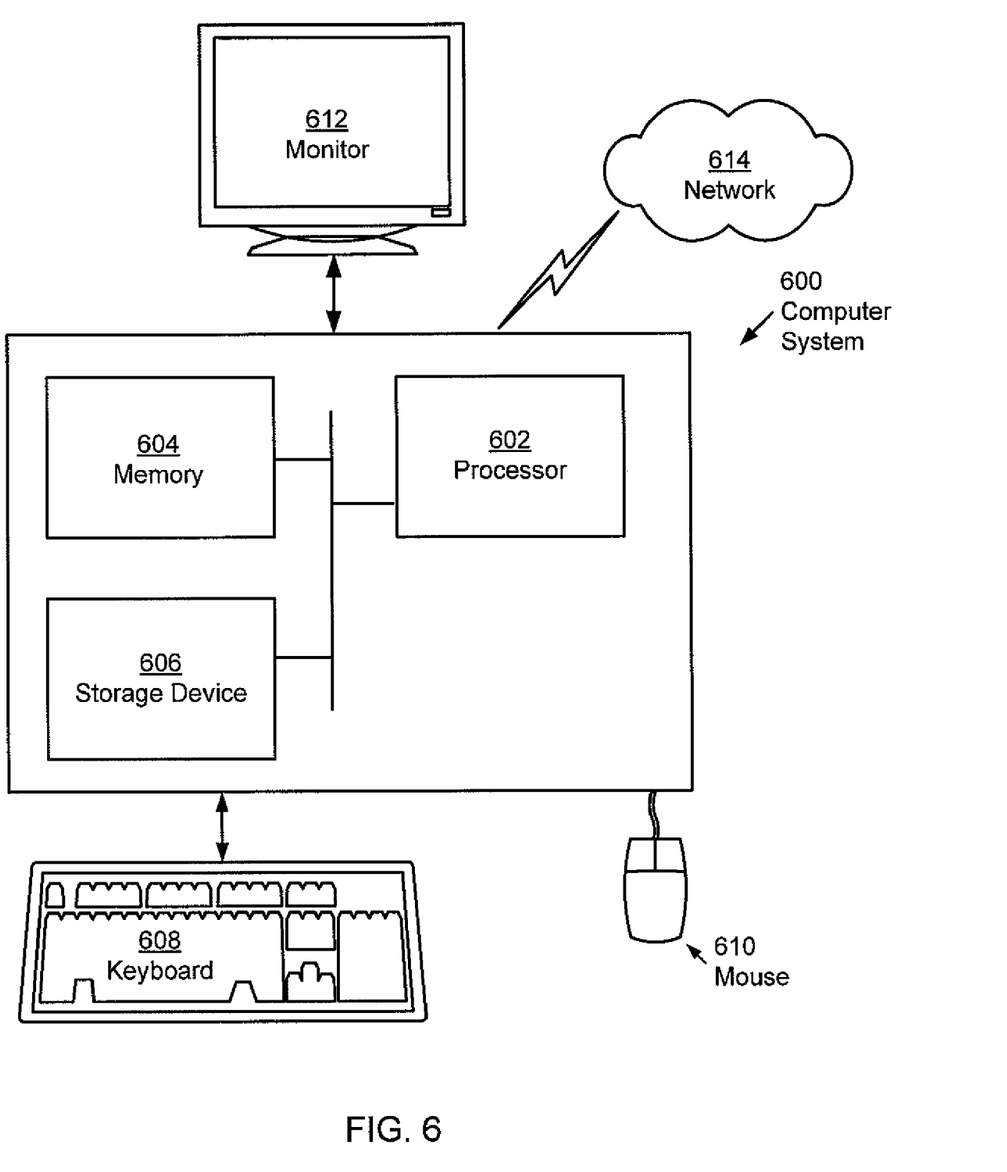
FIG. 6 shows a computer system in accordance with one or more embodiments of the invention.

Embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network or a wide area network (614) via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, computer readable program code (i.e., software instructions) to perform embodiments of the invention may be embodied on a computer readable storage medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for loading shared libraries into a virtual memory of a computer, comprising:
  receiving an indication of a requirement to load the shared library into the virtual memory;
  determining that the shared library is a candidate for using shared large pages;

in response to the determination:
    storing a text section of the shared library in a shared large page of the virtual memory; and
    storing a data section of the shared library in a page of the virtual memory,
wherein the virtual memory is mapped to a physical memory of the computer,
wherein, within an address space of the virtual memory, a starting address of the text section of the shared library is separated from a starting address of the data section of the shared library by a predefined distance,
wherein the predefined distance is larger than a size of the shared large page of the virtual memory,
wherein storing the data section of the shared library in the page of the virtual memory comprises:
    allocating a page of the physical memory to store the data section of the shared library,
    storing the data section of the shared library in the allocated page of the physical memory, and
    mapping the allocated page of the physical memory to the page of the virtual memory.

2. The method of claim 1, wherein storing the text section of the shared library in the shared large page of the virtual memory comprises:
    allocating a shared large page of the physical memory to store the text section of the shared library;
    storing the text section of the shared library in the allocated shared large page of the physical memory; and
    mapping the allocated shared large page of the physical memory to the shared large page of the virtual memory.

3. The method of claim 2, wherein the shared large page of the physical memory is a contiguous region of physical memory.

4. The method of claim 2, wherein mapping the shared large page of the physical memory to the shared large page of the virtual memory comprises creating an entry in a page table.

5. The method of claim 4, wherein mapping the shared large page of the physical memory to the shared large page of the virtual memory further comprises creating an entry in a translation lookaside buffer using the page table.

6. The method of claim 1, wherein the shared large page of the virtual memory is a contiguous region of the virtual memory.

7. The method of claim 1, wherein the shared large page of the virtual memory is larger than the page of the virtual memory.

8. The method of claim 1, wherein determining that the shared library is a candidate for using shared large pages comprises determining that the text section of the shared library and the data section of the shared library are required to be separated by the predefined distance.

9. The method of claim 1, further comprising:
    receiving an indication of a requirement to load a second shared library into the virtual memory;
    upon determining that the second shared library is a candidate for using the shared large page of the virtual memory:
        storing a text section of the second shared library in the shared large page of the virtual memory; and
        storing a data section of the second shared library in a second page of the virtual memory;
    wherein, within the address space of the virtual memory, a starting address of the text section of the second shared library is separated from a starting address of the data section of the second shared library by the predefined distance.

10. The method of claim 9, wherein storing the text section of the second shared library in the shared large page of the virtual memory comprises:
    storing the text section of the second shared library in the allocated shared large page of the physical memory, wherein the text section of the shared library and the text section of the second shared library are stored contiguously in the shared large page of virtual memory.

11. The method of claim 9, wherein storing the data section of the second shared library in the second page of the virtual memory comprises:
    allocating the second page of the physical memory to store the data section of the shared library;
    storing the data section of the shared library in the allocated second page of the physical memory; and
    mapping the allocated second page of the physical memory to the second page of the virtual memory.

12. The method of claim 1, further comprising:
receiving an indication of a requirement to load a second shared library into the virtual memory;
upon determining that the second shared library is a candidate for using the shared large page of the virtual memory and that the shared large page of the virtual memory lacks sufficient space to store a text section of the second shared library:
    storing a first portion of the text section of the second shared library in the shared large page of the virtual memory;
    storing a second portion of the text section of the second shared library in a second shared large page of the virtual memory; and
    storing a data section of the second shared library in a second page of the virtual memory;
wherein, within the address space of the virtual memory, a starting address of the first portion of the text section of the second shared library is separated from a starting address of the data section of the second shared library by the predefined distance,
wherein the second shared large page of the virtual memory is contiguous to the shared large page of the virtual memory, such that the text section of the second shared library spans across the shared large page of the virtual memory and the second shared large page of the virtual memory.

13. A system, comprising:
a processor;
a physical memory; and
a computer readable storage medium having computer readable program code embodied therein, the computer readable program code adapted to, when executed by the processor, implement a method for loading a shared library into a virtual memory, the method comprising:
    receiving an indication of a requirement to load the shared library into the virtual memory;
    determining that the shared library is a candidate for using shared large pages;
    in response to the determination:
        storing a text section of the shared library in a shared large page of the virtual memory; and
        storing a data section of the shared library in a page of the virtual memory;
    wherein the virtual memory is mapped to the physical memory,
    wherein, within an address space of the virtual memory, a starting address of the text section of the shared library is separated from a starting address of the data section of the shared library by a predefined distance, wherein the predefined distance is larger than a size of the shared large page of the virtual memory, wherein storing the data section of the shared library in the page of the virtual memory comprises:

allocating a page of the physical memory to store the data section of the shared library, storing the data section of the shared library in the allocated page of the physical memory, and mapping the allocated page of the physical memory to the page of the virtual memory.

14. The system of claim 13, wherein storing the text section of the shared library in the shared large page of the virtual memory comprises:

allocating a shared large page of the physical memory to store the text section of the shared library;

storing the text section of the shared library in the allocated shared large page of the physical memory; and mapping the allocated shared large page of the physical memory to the shared large page of the virtual memory.

15. A computer readable storage medium having computer readable program code embodied therein, the computer readable program code adapted to, when executed by a processor, implement a method for loading a shared library into a virtual memory, the method comprising:

receiving an indication to load the shared library into the virtual memory;

determining that the shared library is not identified in a library registry;

in response to the determination:

storing a text section of the shared library at a virtual address located in a shared large page of the virtual memory;

updating the library registry with the virtual address and a physical address of the text section of the shared library, wherein the virtual address is designated as a preferred virtual address for mapping the shared library, and wherein the physical address is located in a large page of a physical memory; and creating an entry in a shared page table to map the large page of the physical memory to the shared large page of the virtual memory, wherein the shared page table is shared by a plurality of processes, wherein the virtual memory is mapped to the physical memory, wherein the library registry is a data structure which identifies the shared library to the plurality of processes.

16. The computer readable storage medium of claim 15, further comprising, prior to storing the text section of the shared library at the virtual address:

determining that the shared library is a candidate for shared large pages.

17. The computer readable storage medium of claim 15, further comprising, after creating the entry in the shared page table:

storing a data section of the shared library in at least one page of the virtual memory, wherein, within an address space of the virtual memory, a starting address of the text section of the shared library is separated from a starting address of the data section of the shared library by a predefined distance, and wherein the predefined distance is larger than a size of the shared large page of the virtual memory.

18. The computer readable storage medium of claim 15, further comprising:

receiving a second indication to load the shared library into the virtual memory;

upon determining that the shared library is identified in the library registry:

retrieving the virtual address for the text section of the shared library from the library registry; and using the entry from the shared page table to access the text section of the shared library.

* * * * *